No. 607,507. Patented July 19, 1898.
P. DANCKWARDT.
PROCESS OF AND APPARATUS FOR MAKING FERROCYANIDS.
(Application filed Jan. 4, 1898.)
(No Model.)
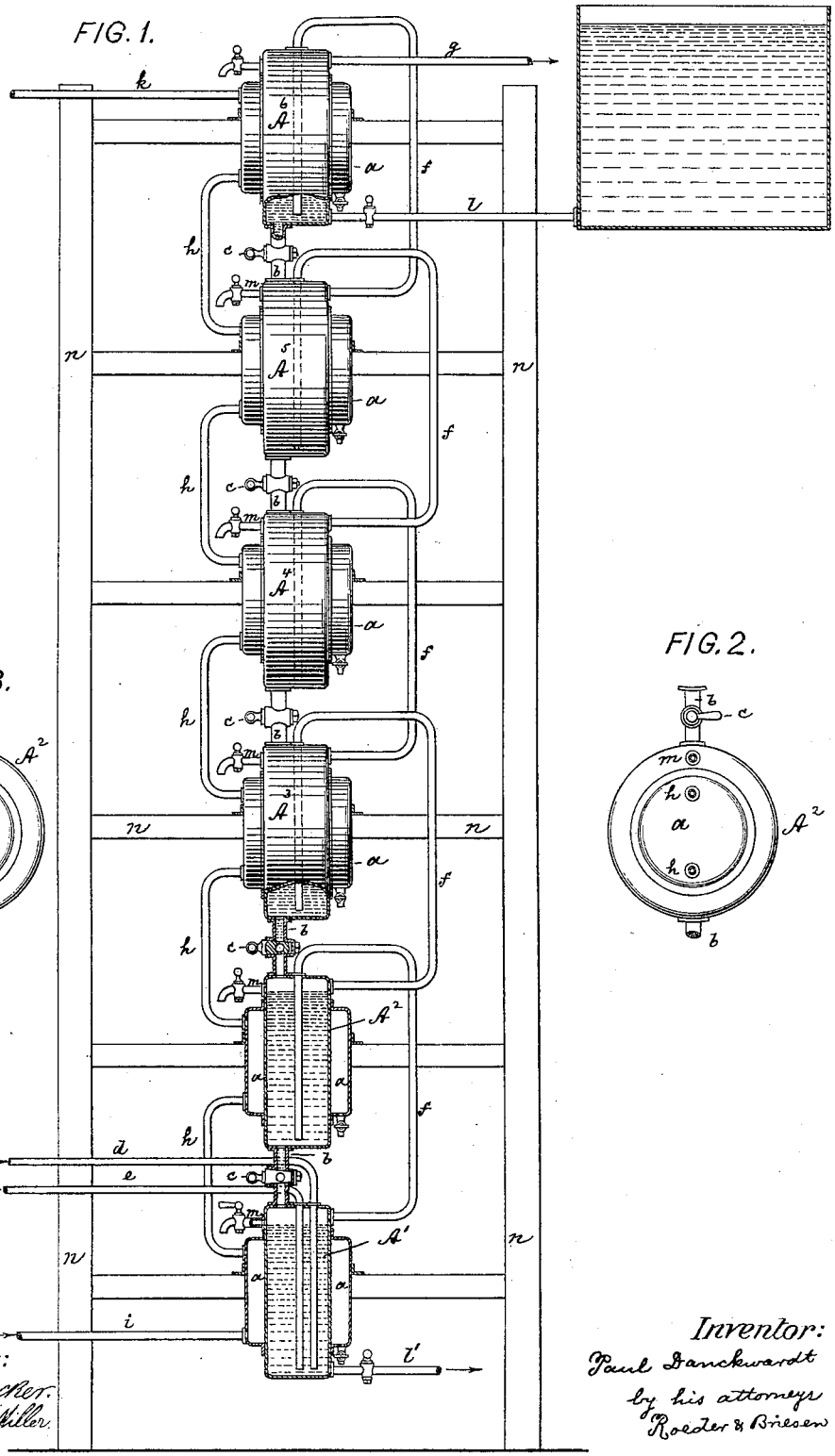
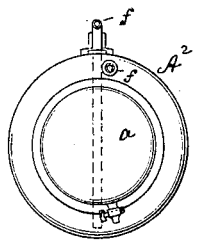
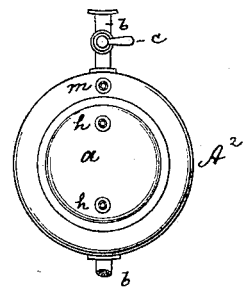
Witnesses:
John Becker.
William Miller.
Inventor:
Paul Danckwardt
by his attorneys
Roeder & Briesen

UNITED STATES PATENT OFFICE.

PAUL DANCKWARDT, OF NEW YORK, N. Y., ASSIGNOR OF TWO-THIRDS TO HENRY HARMS, OF SAME PLACE.

PROCESS OF AND APPARATUS FOR MAKING FERROCYANIDS.

SPECIFICATION forming part of Letters Patent No. 607,507, dated July 19, 1898.

Application filed January 4, 1898. Serial No. 665,560. (No model.)

*To all whom it may concern:*

Be it known that I, PAUL DANCKWARDT, a citizen of Germany, residing at New York city, county and State of New York, have invented certain new and useful Improvements in Processes of and Apparatus for Producing Alkali Ferrocyanids, of which the following is a specification.

This invention relates to an improved process and apparatus for producing an alkali ferrocyanid, and especially sodium forrocyanid, and is carried out briefly as follows:

I first make a sulfocyanid by leading gaseous carbon bisulfid and ammonia into a lye of caustic lime contained in a battery of iron pots, the temperature of which is kept at about 100° centigrade, whereby the lime of the lowermost or first pot is after awhile changed into a strong solution of calcium sulfocyanid. This solution is drawn off from the first pot and run into a tank, where it is mixed with carbonate of sodium. The carbonate of lime thus formed is filtered off, and the filtrate containing now sodium sulfocyanid is evaporated to dryness, using a vacuum to expel the last traces of moisture at a low temperature in order to prevent decomposition. The dry sodium sulfocyanid is intimately mixed with lime and charcoal containing some carbid or carbids, preferably calcium carbid and iron carbid, (previously prepared by heating lime, iron oxid or carbonate, and charcoal in the electric arc,) and then the mixture of sulfocyanid, lime, charcoal, and carbid is melted. The molten mixture is removed from the crucible and after cooling extracted by boiling water. The solution thus obtained is filtered off and boiled with iron ore (carbonate) to keep the sulfur and lime completely out of the solution. After again filtering I obtain a solution of sodium ferrocyanid with little carbonate. This solution is either evaporated and crystallized or directly evaporated to dryness and used in this form for the manufacture of other chemicals.

In the accompanying drawings, Figure 1 is a sectional elevation of an apparatus embodying my invention and which is used for producing the calcium sulfocyanid. Figs. 2 and 3 illustrate the two sides of one of the pots.

The apparatus consists of a battery of iron pots $A'$ to $A^6$, arranged one above another and provided each with a steam-jacket $a$. Pipes $b$, with valves $c$, form connections between the pots, so that the contents of any one pot may be discharged by gravity into the pot next below. The lowermost pot $A'$ communicates with two inlet-pipes $d$ and $e$ for introducing gases, while the uppermost pot $A^6$ communicates with a gas-escape pipe $g$. A series of pipes $f$ connect the upper section of each pot with the lower section of the pot next above and serve for conducting the escaping gases from pot to pot. Each pot is furthermore provided near its top with a small valve-controlled outlet $m$, which serves for testing the height of the fluid and for taking samples. All the steam-jackets $a$ are connected with one another by pipes $h$, the lowermost jacket being fed from steam-supply pipe $i$, while the uppermost jacket connects with steam-outlet pipe $k$. Two pipes $l$ and $l'$, entering, respectively, the uppermost pot $A^6$ and the lowermost pot $A'$, serve for charging the system with lye and for discharging the sulfocyanid.

The entire apparatus is set up for better support in a wooden frame $n$, as shown.

In order to manufacture sufocyanid by means of the above-described apparatus, I charge the jackets $a$ with steam, open the valves $c$, and run in a lye of slaked lime through pipe $l$. The charging is so regulated by means of the valves $c$ that each of the pots is filled up to about the level of the outlet $m$, and when this point is reached the supply is stopped. The pipes $d$ and $e$ are now connected to the generators for carbon bisulfid and ammonia, and a steady stream of these gases is introduced into the apparatus, the ammonia being slightly in excess of the carbon bisulfid. At the beginning nearly all the carbon bisulfid and ammonia are absorbed in the first pot $A'$, and as the temperature rises the following reactions take place:

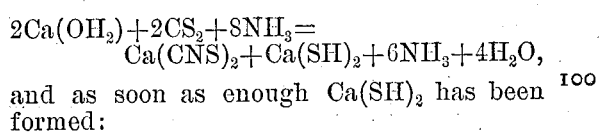

and as soon as enough $Ca(SH)_2$ has been formed:

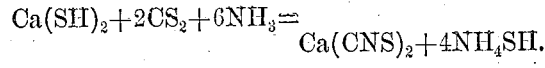

By the heat of the steam-jackets the ammonia and the ammonia hydrosulfid and any unabsorbed carbon bisulfid are driven upward into the second pot, where the hydrosulfid reacts with the fresh supply of lime to form hydrosulfid of calcium; but the calcium sulfocyanid being not volatile is more and more concentrated in the first pot. The reaction taking place more particularly in the second pot is therefore expressed by the formula:

$$2NH_4SH + Ca(OH)_2 = Ca(SH)_2 + 2NH_3 + 2H_2O.$$

If, however, as stated, the carbon bisulfid is not totally absorbed in the first pot, there will take place in the second pot partly the same reactions as in the first pot, and even in the third pot this will happen, for it will only depend upon the proportion between carbon bisulfid and ammonia and on the speed of the current, which I so regulate that calcium sulfocyanid is principally formed in the two lowermost pots, while the reaction of the third formula takes place principally in the upper pots. The end result after a longer time, therefore, will be in the first pot a concentrated solution of calcium sulfocyanid, in the second pot less calcium sulfocyanid and considerable calcium hydrosulfid, and as according to the above formulas there is constantly formed more ammonium hydrosulfid than calcium sulfocyanid the contents of the upper pots will be changed into calcium hydrosulfid before the solution of the first pot is concentrated enough to be withdrawn from it. Therefore as soon as the caustic lime of the uppermost pot will have been transformed into calcium hydrosulfid the ammonia escaping from pipe $g$ will contain ammonium hydrosulfid. To prevent this, samples are taken from time to time from pipe $l$ of the uppermost pot and are tested to ascertain if all the calcium hydroxid has been changed into hydrosulfid. If it is found to contain but little hydroxid, the supply of ammonia and carbon bisulfid is stopped for a while and the uppermost pot is emptied through pipe $l$. The solution of calcium hydrosulfid thus obtained may be utilized for other purposes or the sulfur may be recovered from it by some of the known processes. The empty pot is then refilled with fresh lye of caustic lime, and the process is continued until the lowermost pot contains a concentrated solution of calcium sulfocyanid. The supply of carbon bisulfid and ammonia is then again stopped and the contents of the lowermost pot are drawn into a tank, while the contents of pot $A^2$ are transferred to pot $A'$ by opening valve $c$, that of pot $A^3$ to pot $A^2$, and so on, while the uppermost pot is filled with a fresh charge of lye of caustic lime. The process is then continued as before. To the solution of calcium sulfocyanid drawn from the pot $A'$ into the tank is now added an alkali carbonate, preferably sodium carbonate, and after the precipitate of calcium carbonate so formed has been filtered off the filtrate is evaporated to dryness, using a vacuum-pump during the last stage of the process in order to prevent decomposition by the rise of temperature. The dry sodium sulfocyanid is then intimately mixed with sodium carbonate, lime, charcoal, and some carbid or carbids, preferably calcium and iron carbids, which mixture is previously made by heating carbonate of lime, some iron ore, and charcoal between the two poles of an electric current. This mass has an extremely high reducing power, because the iron is in a very fine state of division and the carbid of calcium is a powerful desulfurizer. When, therefore, this mass mixed with the sulfocyanid is strongly heated, the sulfur of the sulfocyanid is taken up partly by the calcium, partly by the iron, and the liberated carbon prevents any oxidation of the carbon contained in the sulfocyanid. This reaction may be expressed by the following formulas:

I. $NaCNS + CaC_2 = NaCN + CaS + C_2$.

II. $2NaCNS + 2CaO = 2NaCN + 2CaS + O_2$.

III. $C_2 + O_2 = 2CO$ (carbon oxid.)

The output in ferrocyanid is therefore considerably higher with this mass as a reducing agent than by using only scrap-iron or iron turnings, which are often greatly contaminated with silicious matter and oxids destroying cyanid.

By the addition of some carbonate of sodium any sodium of the sulfocyanid is prevented from being taken away by the sulfid of iron to form double salts with sulfid, of which compounds always a considerable number are formed, with the result of producing so much less ferrocyanid.

The molten mass is left to cool and is then extracted by boiling water. The solution thus obtained contains ferrocyanid of sodium with some sulfids.

To purify the solution, I add to it some iron ore (carbonate) and a little carbonate of sodium and boil up, whereby the sulfur is precipitated as sulfid of iron and any lime as carbonate of lime. The filtrate from this solution, containing only sodium ferrocyanid and carbonate of sodium, is either concentrated and crystallized or directly evaporated to dryness and used in this form for the manufacture of other chemicals.

What I claim is—

1. The process of producing alkali ferrocyanid which consists in mixing alkali sulfocyanid with lime, charcoal and a carbid, heating the mass, and then leaching it with water and separating the ferrocyanid, substantially as specified.

2. The process of producing alkali ferrocyanid which consists in mixing alkali sulfocyanid with sodium carbonate, lime, charcoal, carbid of lime and carbid of iron, heating the mass, and then leaching it with water and separating the ferrocyanid, substantially as specified.

3. An apparatus for producing sulfocyanid in the manufacture of alkali ferrocyanid which consists of a battery of connected pots, heating-jackets surrounding the same, gas-inlet pipes entering the lowermost pot, a liquid-charging pipe entering the uppermost pot, a series of gas-pipes connecting the tops of the pots with the bottoms of the pots next above, and valves between the pots, substantially as specified.

PAUL DANCKWARDT.

Witnesses:
F. v. BRIESEN,
WILLIAM MILLER.